(12) United States Patent
Siegrist et al.

(10) Patent No.: US 6,722,658 B2
(45) Date of Patent: Apr. 20, 2004

(54) WIPER WITH INTEGRATED SEAL

(75) Inventors: Uwe Siegrist, Ottrau (DE); Otmar Braun, Frielendorf (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/221,283

(22) PCT Filed: Jan. 8, 2001

(86) PCT No.: PCT/EP01/00103

§ 371 (c)(1),
(2), (4) Date: Nov. 14, 2002

(87) PCT Pub. No.: WO01/66980

PCT Pub. Date: Sep. 13, 2001

(65) Prior Publication Data

US 2003/0178786 A1 Sep. 25, 2003

(30) Foreign Application Priority Data

Mar. 7, 2000 (DE) .......................................... 100 10 524

(51) Int. Cl.⁷ ................................................. F16J 15/32
(52) U.S. Cl. ........................ 277/436; 277/438; 277/552; 277/566
(58) Field of Search ................................ 277/349, 351, 277/438, 549, 551, 436, 552, 558, 560, 565, 566

(56) References Cited

U.S. PATENT DOCUMENTS

| | | |
|---|---|---|
| 4,106,781 A | 8/1978 | Benjamin et al. |
| 4,399,998 A | 8/1983 | Otto |
| 4,448,461 A | 5/1984 | Otto |
| 4,522,411 A | 6/1985 | Burgan |
| 4,616,836 A | 10/1986 | Drygalski et al. |
| 5,167,419 A | 12/1992 | Robertson |

FOREIGN PATENT DOCUMENTS

| | | |
|---|---|---|
| DE | 7220827 | 8/1972 |
| DE | 35 28 961 | 2/1987 |
| DE | 296 16 242 | 7/1997 |

*Primary Examiner*—Anthony Knight
*Assistant Examiner*—Vishal Patel
(74) *Attorney, Agent, or Firm*—Kenyon & Kenyon

(57) ABSTRACT

A wiper having an integrated seal, comprising at least one dynamically stressed, first sealing lip arranged in the direction of a space to be sealed, and at least one wiping lip disposed on the side facing away from the space to be sealed. The wiper having an integrated seal also includes quasi-statically stressed second, third and fourth sealing lips which are each configured to be placed against at least one counter-surface of a mounting space of the wiper with integrated seal. The second sealing lip is fluid-conductive. The third and fourth sealing lips are each configured as a pressure relief valve, and sealing lips are arranged in series.

7 Claims, 3 Drawing Sheets

WIPER WITH INTEGRATED SEAL

FIELD OF THE INVENTION

The present invention relates to a wiper. More specifically, the present invention relates to a wiper having an integrated seal.

BACKGROUND INFORMATION

German Patent Application No. 296 16 242 U1 describes a double wiper. The double wiper is provided for sealing a movable part with respect to a pressure system, the double wiper surrounding the movable part as a ring. A connection is produced between the two end faces of the double wiper when an opening pressure in the pressure system is exceeded.

SUMMARY OF THE INVENTION

According to one embodiment of the present invention, the present invention seeks to provide a wiper of the type described above in such a way that the wiper with the integrated seal is relieved from pressure. In addition, the present invention seeks to provide a wiper of the type described above in such a way that penetration of dirt and moisture along quasi-static sealing lips in the direction of the space to be sealed is reliably avoided.

To achieve the objective, a wiper having an integrated seal is provided, including at least one first, dynamically stressed sealing lip arranged in the direction of the space to be sealed and at least one wiping lip arranged on the side facing away from the space to be sealed. In addition, the wiper with integrated seal includes three quasi-statically stressed second, third and fourth sealing lips, which are each able to be placed against at least one counter-surface of the mounting space of the wiper with integrated seal. The second sealing lip is fluid-conductive. Each of the third and fourth sealing lips are formed and operate as a pressure relief valve. The second, third and fourth sealing lips are arranged to function in series. Due to the arrangement of the quasi-statically stressed sealing lips in series, they essentially function as a labyrinth seal to effectively prevent penetration of impurities from the surroundings past the quasi-statically stressed sealing lips into the space to be sealed.

To avoid an undesirably large displacement of the wiper with integrated seal within its mounting space, the second sealing lip is fluid-conductive, the third and fourth sealing lips are configured as a pressure relief valve. The third and fourth sealing lips are able to be lifted off of their respective counter-surfaces, for example, in response to an opening pressure of approximately 4 bar. The wiper is thereby prevented from being undesirably greatly deformed and/or being forced out of its mounting space. The third sealing lip is disposed functionally between the second and the fourth sealing lips. The third sealing lip prevents impurities from the surroundings from being able to penetrate past the second sealing lip into the space to be sealed. Even if the impurities have already passed the fourth sealing lip, there is no disadvantageous effect on the working properties of the wiper. Because the impurities are reliably held back by the fourth and third sealing lips, the second sealing lip does not come into contact with the impurities. The second sealing lip is thereby protected from wear and tear during a long service life, and dirt is effectively prevented from penetrating into the space to be sealed off.

Under normal operating conditions, the space to be sealed off in front of the seal integrated into the wiper is at zero pressure. The space may be empty, partially filled or completely filled with a medium to be sealed off. Under certain conditions, the medium may also be under a low pressure of up to 4 bar.

The third and fourth sealing lips sealingly abut against the wall of a housing, the wall bounding the mounting space.

The third sealing lip is configured such that medium to be sealed is reliably held back on the side of the second sealing lip facing the space to be sealed. A passage of fluid past the third sealing lip in the direction of the fourth sealing lip is prevented provided that the aforementioned pressure is not exceeded.

The second sealing lip is constructed so that it also abuts against the wall of the housing. However, due to the structure of its surface or due to small gaps in the sealing edge, the second sealing lip allows a small volumetric flow to pass which is sufficient to relieve the pressure.

If the pressure within the space to be sealed rises above 4 bar, for example, due to leakage of a further seal upstream of the wiper with integrated seal in the direction of the space to be sealed off, then a volumetric flow takes place past the second sealing lip in the direction of the third sealing lip. Due to the pressure, the third sealing lip allows the volumetric flow to pass in the direction of the fourth sealing lip. The fourth sealing lip lifts off briefly from its counter-surface, so that the volumetric flow emerges visibly as leakage in the direction of the surroundings. The visible leakage is an indication that seals within the space to be sealed and/or the rod to be sealed are damaged/worn out and should be replaced.

Of the quasi-statically stressed sealing lips, at least the second sealing lip facing the space to be sealed has a surface structure with a roughness $R_a$ of greater than 2 $\mu$m. Such a surface structure can be achieved, for example, when manufacturing the wiper with integrated seal by forming in a mold having a corresponding surface roughness. The surface roughness in the mold can be produced, for example, by eroding the relevant surface.

It is also possible to produce the surface structure in a different manner, for example, by blasting the surface with a granular material of steel, non-ferrous metals, sand, ceramics or plastic having a particle size of the granular material of approximately 2 to 20 $\mu$m. The surface roughness yields for the medium to be sealed a fluid-conductive connection in the direction of the third sealing lip via the second sealing lip without the second sealing lip lifting off from the counter-surface. Thus, the surface structure permits a fluid-conductive connection between the space to be sealed and the third sealing lip.

The fluid-conductive connection may also be produced or supported by one or more gaps, for example, by grooves running in the axial direction in the area of the second sealing edge.

The third sealing lip, arranged between the second and the fourth sealing lips, preferably has a sealing edge which is bounded by two mutually intersecting conical surfaces. The first conical surface faces the space to be sealed, forming a smaller angle relative to an imaginary axis parallel to the axis of symmetry than the second conical surface facing away from the space to be sealed. The first conical surface preferably forms a first angle of approximately 15° relative to the axis. The second conical surface preferably forms a second angle of approximately 45° relative to the axis.

The third sealing edge may be smooth or else may be provided with a structure similar to the second sealing edge. Due to the comparatively flat first angle and the steeper second angle, when the opening pressure is exceeded, the third sealing lip is deformed in such a way that the medium to be sealed passes the third sealing lip in the direction of the fourth sealing lip. Advantageously, a volumetric flow is able to travel past the third sealing lip in the direction of the fourth sealing lip, for example, through grooves extending essentially in the radial direction, within the sealing ring between the third and the fourth sealing edge, or through channels within the mounting space which are also not closable by an adjacent seal.

According to a preferred embodiment, the passage may be formed by a plurality of grooves, extending in the radial direction and distributed uniformly in the circumferential direction, which form a component of the wiper with integrated seal.

To achieve good seal tightness, the dynamically stressed, first sealing lip preferably has a sealing edge which is sharp or provided with a small radius of 0.2 mm or less. The wiping lip is preferably rounded, having a radius R=0.2. In contrast, sharp-edged wiping lips wipe off too strongly, causing unwanted wiper leakage, and, for example, the medium to be sealed located on a rod is not completely conveyed back again in the direction of the space to be sealed.

According to a preferred embodiment, the wiper with integrated seal is used in conjunction with one or more upstream rod seals, for example, in building machinery or other applications of mobile hydraulics.

DETAILED DESCRIPTION

Figure 1:
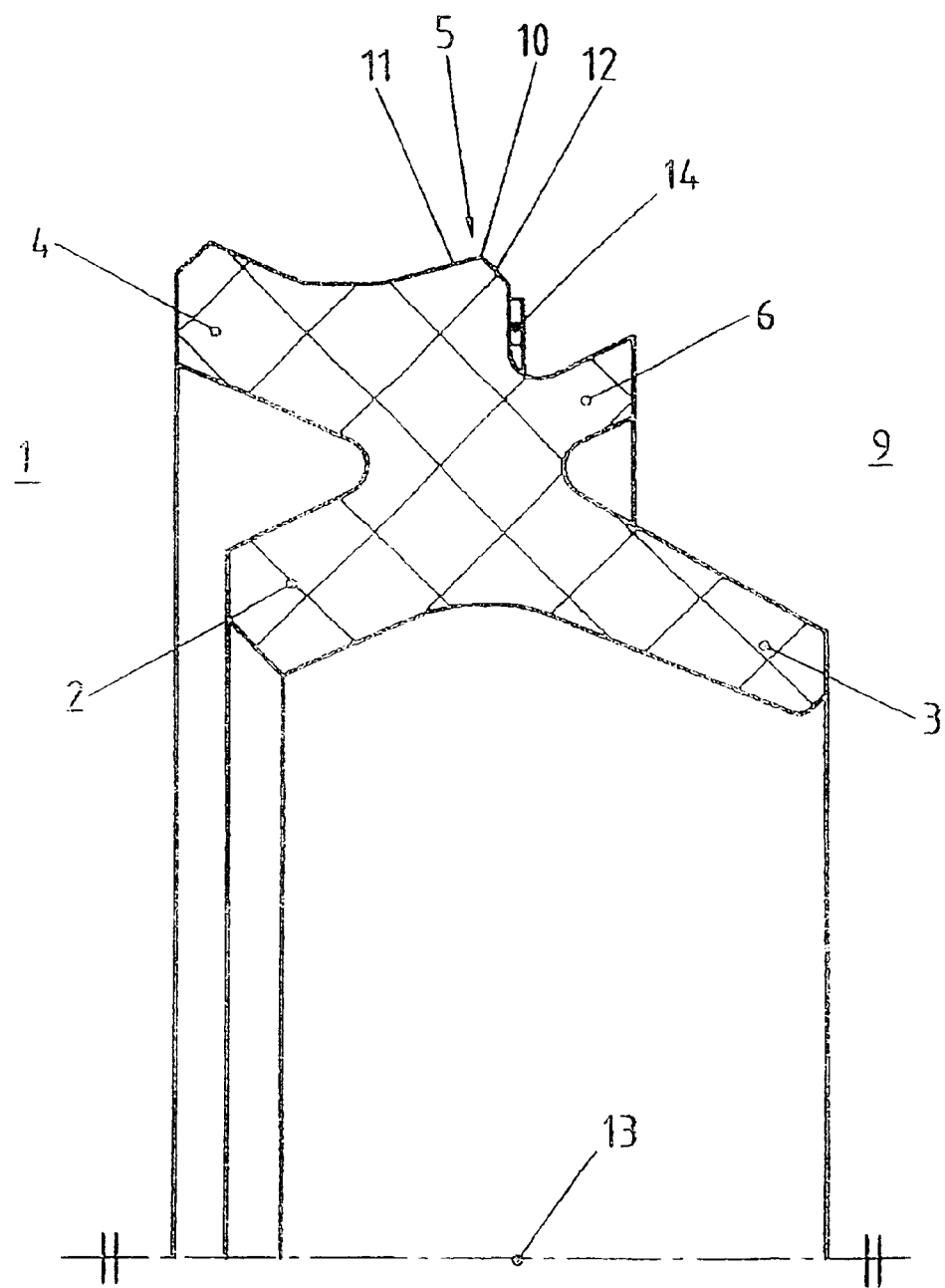
FIG. 1 is a partially cross-sectional view of a wiper having an integrated seal, according to one embodiment of the present invention.
Figure 2:
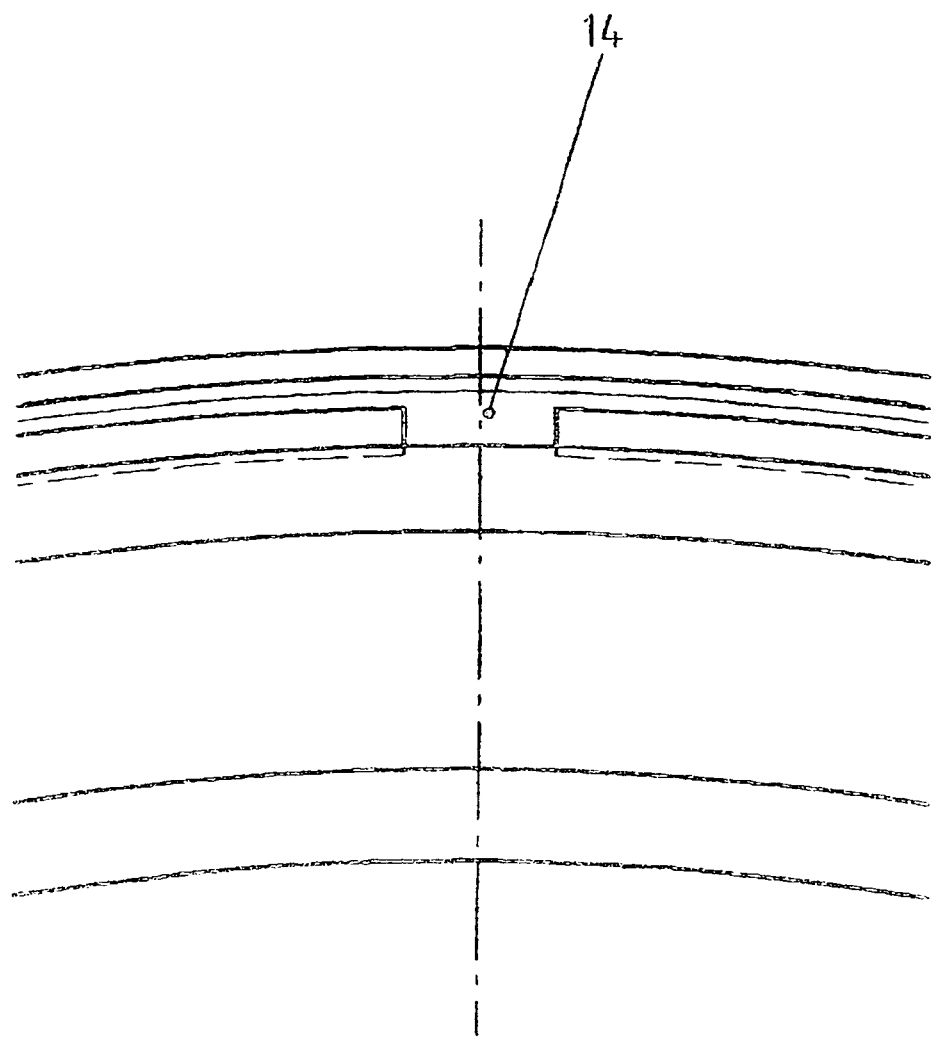
FIG. 2 is a top view of the wiper having an integrated seal, shown from the wiper side and directed toward the surroundings, according to the embodiment of the present invention illustrated in FIG. 1.

FIGS. 1 and 2 show a wiper having an integrated seal. The wiper with integrated seal has dynamically stressed, first sealing lip (2) radially on the inside, and a likewise dynamically stressed wiping lip (3) on the side facing away from space (1) to be sealed. First sealing lip (2) has a sharp sealing edge, while wiping lip (3) has a radius of 0.2 mm. Wiping lip (3) is formed in such a way that, when the rod is extended, the wiping lip allows the very thin film of medium to be sealed, which is located on rod (16) and which is not completely wiped off by first sealing lip (2), to pass in the direction of the surroundings. When rod (16) is retracted, wiping lip (3) allows this lubricant film to pass again in the direction of space (1) to be sealed, while impurities from the surroundings are wiped from the surface of the retracting rod. The thin film of medium to be sealed located on rod (16) lubricates wiping lip (3).

Radially on the outside, the wiper with integrated seal has three, quasi-statically stressed sealing lips (4, 5, 6) arranged in series. Second sealing lip (4), facing space (1) to be sealed, preferably has a surface structure with a roughness Ra of greater than 2 $\mu$m. The structure may be produced during manufacturing in a shaping mold having a corresponding surface roughness. Alternatively, the roughness may be produced in the mold by an eroding process.

Third sealing lip (5), arranged in the axial direction between second sealing lip (4) and fourth sealing lip (6), is bounded by the two mutually intersecting conical surfaces (11, 12). First conical surface (11) forms a first angle of approximately 15° relative to a line running parallel to axis (13) and touching third sealing lip (5), while second conical surface (12) forms a second angle of approximately 45° relative to this line.

In this embodiment of the present invention, three grooves (14) are provided to permit a passage of medium to be sealed past third sealing lip (5) in the direction of fourth sealing lip (6). The three grooves (14) are advantageously distributed uniformly in the circumferential direction, which extend essentially in the radial direction. A passage of fluid from third sealing lip (5) in the direction of fourth sealing lip (6) is also possible when the wiper with integrated seal abuts, within its mounting space (8), by way of its areas bordering the grooves (14).

Figure 3:
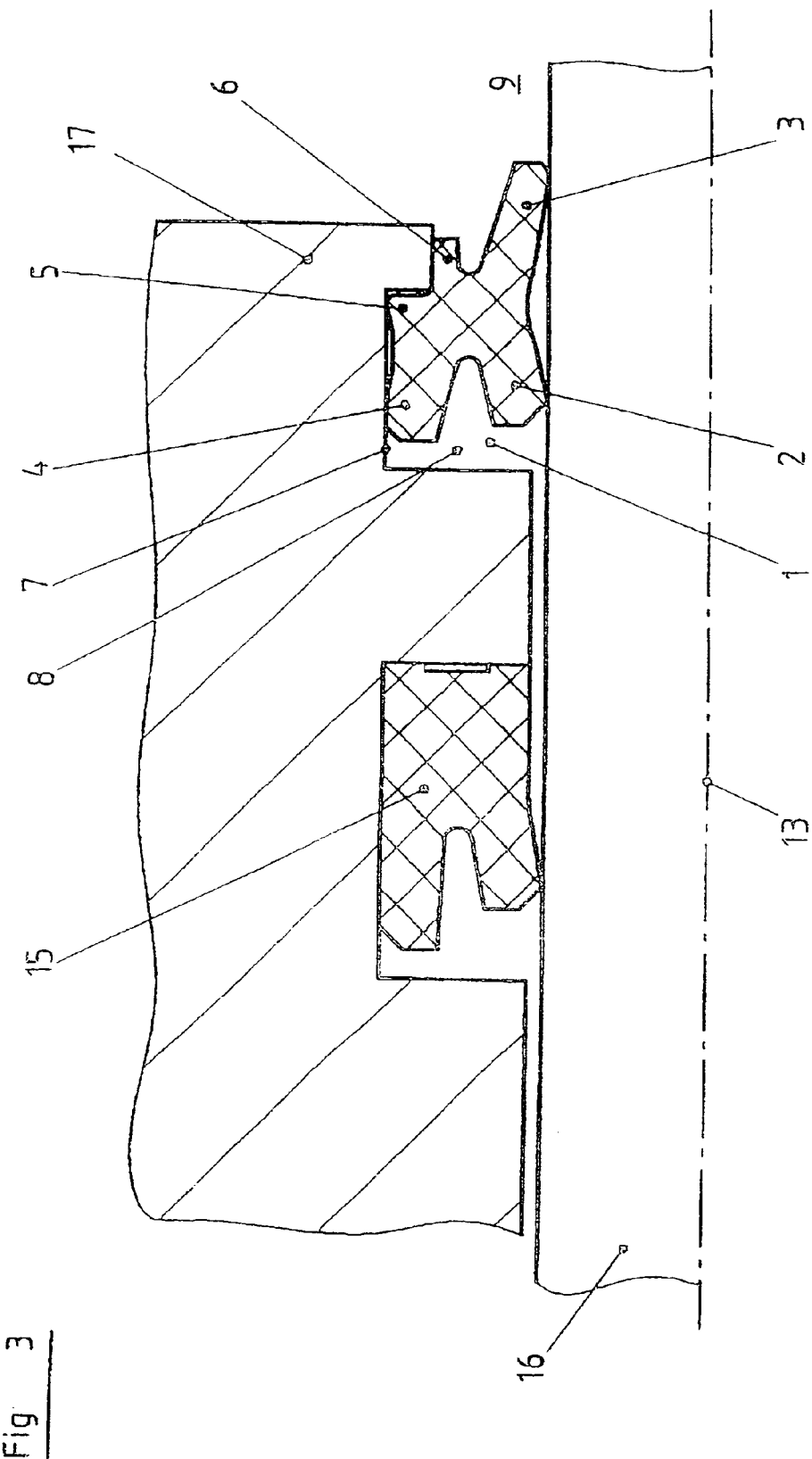
FIG. 3 illustrates the wiper having an integrated seal as shown in FIGS. 1 and 2, in the installed state in conjunction with an upstream rod seal.

FIG. 3 illustrates the wiper with integrated seal of FIGS. 1 and 2 in the installed state. A further seal (15) is disposed on the side of the wiper with integrated seal facing space (1) to be sealed.

Only when seal (15) and/or the surface of rod (16) to be sealed exhibits wear and/or damage is medium to be sealed conveyed past seal (15) in the direction of the claimed wiper with integrated seal and surroundings (9). To avoid an undesirably high pressure build-up between seal (15) and the wiper with integrated seal, the surface of the second sealing lip (4) is provided with a rough, fluid-conducting structure, and third sealing lip (5) is able to be lifted from its counter-surface (7), in the same way as fourth sealing lip (6). A costly pressure-relief bore hole in housing (17) is thereby rendered unnecessary.

What is claimed is:

1. A wiper having an integrated seal, comprising:
   at least one dynamically-stressed, first sealing lip arranged in the direction of space to be sealed;
   at least one wiping lip disposed on the side facing away from the space to be sealed; and
   second, third and fourth sealing lips which are three quasi-statically stressed and which are each configured to be placed against at least one counter-surface of a mounting space, the second sealing lip being fluid-conductive, the third and fourth sealing lips each being configured as a pressure relief valve, the second, third and fourth sealing lips being arranged in series.

2. The wiper as recited in claim 1, wherein of the second, third and fourth sealing lips, at least the second sealing lip, facing the space to be sealed, has a surface roughness $R_a$ of greater than 2 $\mu$m.

3. The wiper as recited in claim 1, wherein the second sealing lip has a smooth surface with a roughness of less than or equal to 2 $\mu$m, and the sealing edge has at least one gap in the form of a groove running in the axial direction.

4. The wiper as recited in claim 1, wherein the fourth sealing lip, facing surroundings, is further configured to be lifted off of a corresponding counter-surface if a pressure in the space to be sealed exceeds a predetermined maximum pressure.

5. The wiper as recited in claim 1, wherein the third sealing lip is arranged between the second sealing lip and the fourth sealing lip, the third sealing lip having a sealing edge which is bounded by two mutually intersecting conical surfaces, and wherein a first conical surface facing the space to be sealed forms a smaller angle relative to an axis parallel to an axis of symmetry than a second conical surface facing away from the space to be sealed.

6. The wiper as recited in claim 5, wherein the first conical surface forms a first angle of 15° relative to the axis that is parallel to the axis of symmetry.

7. The wiper as recited in claim 5, wherein the second conical surface forms a second angle of 45° relative to the axis that is parallel to the axis of symmetry.

* * * * *